US006463583B1

(12) United States Patent  (10) Patent No.: US 6,463,583 B1
Hammond  (45) Date of Patent: Oct. 8, 2002

(54) DYNAMIC INJECTION OF EXECUTION LOGIC INTO MAIN DYNAMIC LINK LIBRARY FUNCTION OF THE ORIGINAL KERNEL OF A WINDOWED OPERATING SYSTEM

(75) Inventor: Richard P. Hammond, Simsbury Lane, CT (US)

(73) Assignee: Novadigm, Inc., Mahwah, NJ (US)

( * ) Notice: Subject to any disclaimer, the term of this patent is extended or adjusted under 35 U.S.C. 154(b) by 0 days.

(21) Appl. No.: 09/289,150

(22) Filed: Apr. 8, 1999

(51) Int. Cl.$^7$ .............................. G06F 9/44; G06F 9/45
(52) U.S. Cl. ..................... 717/162; 717/168; 717/125
(58) Field of Search ........................... 717/6, 162, 168, 717/125

(56) References Cited

U.S. PATENT DOCUMENTS 5,535,329 A * 7/1996 Hastings ...................... 714/35
5,583,761 A * 12/1996 Chou .......................... 707/536
5,673,315 A * 9/1997 Wolf .......................... 717/170

(List continued on next page.)

FOREIGN PATENT DOCUMENTS

| EP | 0752647 | 1/1997 | ................... 717/11 |
| WO | 9833106 | 7/1998 | |

OTHER PUBLICATIONS

Copyright Search TX–4–442–052 "Advanced Windows", Jeffrey Richter www.loc.gov.*
IBM Technical Disclosure Bulletin, vol. 31, No. 1, "Dual Indirect RAM/ROM Jump Tables for Firmware Updates", Jun. 1988.*

Livingston, B., "Window Manager. Applications can help you get out of life in DLL hell," Infoworld, Infoworld Media Group Inc., Feb. 16, 1998, vol. 20, Issue 7, http://archive.infoworld.com/cgi–bin/displayArchive.pl?/98/07/o02–07.38.htm, pp.1–3.

(List continued on next page.)

*Primary Examiner*—Gregory Morse
*Assistant Examiner*—Todd Ingberg
(74) *Attorney, Agent, or Firm*—Morrison & Foerster LLP (57) ABSTRACT

Methods and system for dynamically injecting execution logic into shared memory spaces of a windowed operating system. An injection dynamic link library is loaded from an injection application into a pre-determined memory location within an area of shared memory within the windowed operating system. A main dynamic link library function within an original kernel dynamic link library including kernel functions for the windowed operating system is located from the injection dynamic link library. A jump command is inserted from injection dynamic link library within the main dynamic link library function in the kernel dynamic link library to create a modified kernel dynamic link library. The jump command jumps to an injection hook function within the injection dynamic link library whenever a new windowed operating system process is created. The injection hook function within the injection dynamic link library includes multiple injection functions that are executed by the windowed operating system prior to executing any other software applications whenever a new process is created in a windowed operating system. The methods and system of the present invention allow execution logic to be injected into new processes created by windowed operating systems using shared memory spaces such as Microsoft Windows 95/98. The execution logic is executed prior to any application software associated with the new processes. The methods and system of the present invention may be used for debugging aids, hooking other processes, tracing the execution of a process, and for other purposes.

20 Claims, 6 Drawing Sheets

U.S. PATENT DOCUMENTS

| | | | | |
|---|---|---|---|---|
| 5,812,848 | A | | 9/1998 | Cohen ........................ 395/685 |
| 5,958,010 | A | | 9/1999 | Agarwal et al. |
| 5,960,196 | A | * | 9/1999 | Carrier, III et al. .......... 395/701 |
| 6,075,937 | A | * | 6/2000 | Scalzi et al. ........... 395/500.44 |
| 6,202,199 | B1 | * | 3/2001 | Wygodny et al. ............... 717/4 |
| 6,141,698 | A1 | * | 10/2001 | Krishnan et al. ........... 709/331 |

OTHER PUBLICATIONS

"Method for Dynamically Loading Microprocessor Specific Library Functions," IBM Technical Disclosure Bulletin, IBM Corporation, New York, Jun. 1, 1997, vol. 40, No. 6, pp. 77–79.

Hunt, G., et al., "Detours: Binary Interception of Win32 Functions," Technical Report MSR–TR–98–33, Microsoft Research Corporation, One Microsoft Way, Redmond, WA 98052, http://ftp.research.microsoft.com/pub/tr/tr–98–33.pdf, pp. 1–9.

"DLLaGartor Version 2.0 General Availability," Chicago–Soft, Hanover, NH, Apr. 6, 1998, http://www.chicagosoft.com/htm/in_the_lab_DLLagator_availability.html, pp. 1–3.

Kaspersky, E.V., "Win95.K32," Cental Command Inc., 1998, http://www.avpve.com/viruses/win95/k32.html, p.1.

Jeffrey Richter, "Breaking Through Process Boundary Walls", *Advanced Windows*, 3$^{rd}$ Ed., Microsoft Press, Redmond, WA., pp. 899–969 (1997).

* cited by examiner

DYNAMIC INJECTION OF EXECUTION LOGIC INTO MAIN DYNAMIC LINK LIBRARY FUNCTION OF THE ORIGINAL KERNEL OF A WINDOWED OPERATING SYSTEM

FIELD OF INVENTION

This invention relates to computer operating systems. More specifically, it relates to a method and system for dynamic injection of execution logic into a shared memory space of a windowed operating system.

BACKGROUND OF THE INVENTION

Software applications, such as 32-bit applications (e.g., Win32) for windowed operating systems, such as Windows 95/98/NT, by Microsoft Corporation of Redmond, Wash., execute as separate processes that execute within their own address space (WINDOWS and WIN32 are trademarks of Microsoft Corporation of Redmond, Wash.). The Windows 95/98/NT operation systems limit code that can execute within an address space to the code associated with a main executable module (e.g., ".EXE") and Dynamic Link Library ("DLL") modules loaded by a process associated with the main executable module. As is known in the art, a Dynamic Link Library provides a mechanism for linking applications to libraries of functions at run-time.

However, there are many situations where additional functionality needs to be added to a process by injecting execution logic into an address space. In particular, there are situations where it is desirable to inject execution logic into new address spaces that will execute before any application-related code executes. For example, applications to monitor or alter the execution of other applications need such additional functionality.

There are a number of techniques known in the art to inject execution logic into an existing windowed operating system's process. However, these techniques have a number of associated problems. Three of these injection techniques include Dynamic Link Library injection, code patching, and remote threads. The Dynamic Link Library injection technique involves loading a Windows 95/98/NT Dynamic Link Library into an address space and placing injection code within a "DllMain" function. A Dynamic Link Library's DllMain function is called by the Windows 95/98/NT operating system when a process loads or unloads a Dynamic Link Library as well as when a new operating system thread is started or stopped within a process. Thus, loading a Dynamic Link Library into an address space will result in the injected code's execution within an address space. However, the injected code will only be executed after the process begins executing.

As is known in the art, there are two ways to inject a Dynamic Link Library into a Windows address space including using an operating system registry key "AppInit_DLLs" or calling a "SetWindowsHookEx" API function. As is known in the art, an operating system registry stores hardware, software and user configuration settings for particular a computer.

The AppInit_DLLs registry key can be used with Windows NT but is not implemented by Windows 95/98. A data value for the AppInit DLLs registry key can contain a list of Dynamic Link Library module file names. When a User Dynamic Link Library (e.g., USER32.DLL) is loaded into an address space on the Windows NT operating system the user Dynamic Link Library will attempt to load the modules listed in this registry key into a process address space. Use of the AppInit_DLLs registry key will only inject a Dynamic Link Library in a process that executes code within a user's Dynamic Link Library (e.g., USER32.DLL).

Both Windows 95/98 and Windows NT implement a SetWindowsHookEx Application Programmer's Interface ("API") function. This function is used to hook events within a primary operating system thread or for other operating system threads. When SetWindowsHookEx events occur, a callback function within a Dynamic Link Library is called by the Windows 95/98/NT operating system. If the hooked thread belongs to a different process than the calling thread, Windows 95/98/NT loads the required Dynamic Link Library into the hooked operating system thread's address space. This Dynamic Link Library injection will only be invoked after an application associated with a process has started executing.

Code patching techniques for Windows 95/98/NT known in the art require an injecting process to have access to a target process. First the injected code is copied to a memory area in the target process address space. Next the target process is altered so that the injected logic will be executed. Finally, code within an existing execution thread is altered to execute the injected code. This is typically accomplished by calling injected code within an existing process thread. Code patching is designed to work only on specific processes modified by a user and typically requires a high level of programming expertise.

The remote thread technique for Windows 95/98/NT also requires an injecting process having access to a target thread. The injected code is copied to a memory area in the target thread address space. Then a new thread is started for the target process. This new thread executes the injected code. The remote thread technique also works only on specific processes modified by a user.

These injection techniques do not provide the ability for injected code to be the first non-operating system code to execute in new address space for a new process created by a windowed operating system. In addition these injection techniques are designed to work on specific processes modified by a user and do not allow injection techniques that are generally applicable to any process created by a windowed operating system.

Thus, it is desirable to inject execution logic into new address spaces for new processes created by a windowed operating system that will execute before any application-related associated with the process executes. The injected execution logic should be generally applicable to any process created by a windowed operating system and not require a user's to modify specific processes.

SUMMARY OF THE INVENTION

In accordance with preferred embodiments of the present invention, some of the problems associated with injecting execution logic that executes prior to any application logic are overcome. Methods and system for dynamically injecting execution logic into a shared memory space of a windowed operating system is provided.

One aspect of the present invention includes a method for dynamically injecting execution logic into a shared memory space of a windowed operating system. This method includes starting an injection application with a kernel application used by a windowed operating system. An injection virtual device driver is loaded from the injection application into a first pre-determined memory location in an area of shared memory in the windowed operating system. The virtual injection device driver is used to alter protected areas of memory within the windowed operating system. An injection dynamic link library is loaded from the injection application into a second pre-determined memory location within an area of shared memory for the windowed operating system. A main dynamic link library function within an original kernel dynamic link library including kernel functions for the windowed operating system is located from the injection dynamic link library. A jump command is inserted from the injection dynamic link library within the main dynamic link library function in the kernel dynamic link library to create a modified kernel dynamic link library in memory. The jump command jumps to an injection hook function within the injection dynamic link library whenever a new windowed operating system process is created. The injection hook function within the injection dynamic link library includes multiple injection functions that are executed by the windowed operating system prior to executing any application related logic in a new process address space created by the windowed operating system. The original kernel dynamic link library is replaced in memory with the modified kernel dynamic link library on the windowed operating system. The modified kernel dynamic link library on the windowed operating system is used for kernel services anytime a new process is requested on the windowed operating system.

Another aspect of the invention is method for using dynamically injected execution logic in a windowed operating system. This method includes receiving a request to create a new process is on a windowed operating system. A modified kernel dynamic link library including a modified main dynamic link library function with jump command to jump to an injection hook function within an injection dynamic link library is loaded into shared memory within the windowed operating system. The modified kernel dynamic link library was modified by an injection application. The jump command in the main kernel dynamic link library function allows injection logic to be executed prior to executing any application related logic in a new process address space created by the windowed operating system. The modified main dynamic link library function in the kernel dynamic link library is executed to jump to the injection hook function within the injection dynamic link library to execute injection logic prior to executing any application related logic in a new process address space created by the windowed operating system.

Another aspect of the invention includes a system for dynamically injecting execution logic into a shared memory space of a windowed operating system. The injection system includes an injection application, an injection dynamic link library, an injection hook function, and an injection virtual device driver into a shared memory space of a windowed operating system. The injection application is used for loading an injection virtual device driver and an injection dynamic link library into a shared memory space of a windowed operating system. The injection dynamic link library includes multiple injection functions for executing injection logic and for modifying a main kernel dynamic link library function in an original kernel dynamic link library with jump command to jump to an injection hook function within an injection dynamic link library. The injection functions from the injection dynamic link library are used to execute injection logic prior to executing any application related logic in a new process address space created by a windowed operating system. The injection hook function is used for calling injection functions from an injection dynamic link library. The injection hook function is called with a jump command inserted into a main dynamic link library function in an original kernel dynamic link library loaded when a windowed operating system creates a new process. The injection virtual device driver is used for altering protected memory areas within a windowed operating system.

The methods and system of the present invention allow execution logic to be injected into new processes created by windowed operating systems. The execution logic is executed prior to any application related logic in a new process address space created by windowed operating systems. The methods and system of the present invention may be used for debugging aids, hooking other processes, tracing the execution of an application, and for other purposes.

The foregoing and other features and advantages of an illustrative embodiment of the present invention will be more readily apparent from the following detailed description, which proceeds with references to the accompanying drawings.

BRIEF DESCRIPTION OF THE DRAWINGS

Preferred embodiments of the present invention are described with reference to the following drawings, wherein.

DETAILED DESCRIPTION OF PREFERRED EMBODIMENTS

Exemplary Computing System

Figure 1:
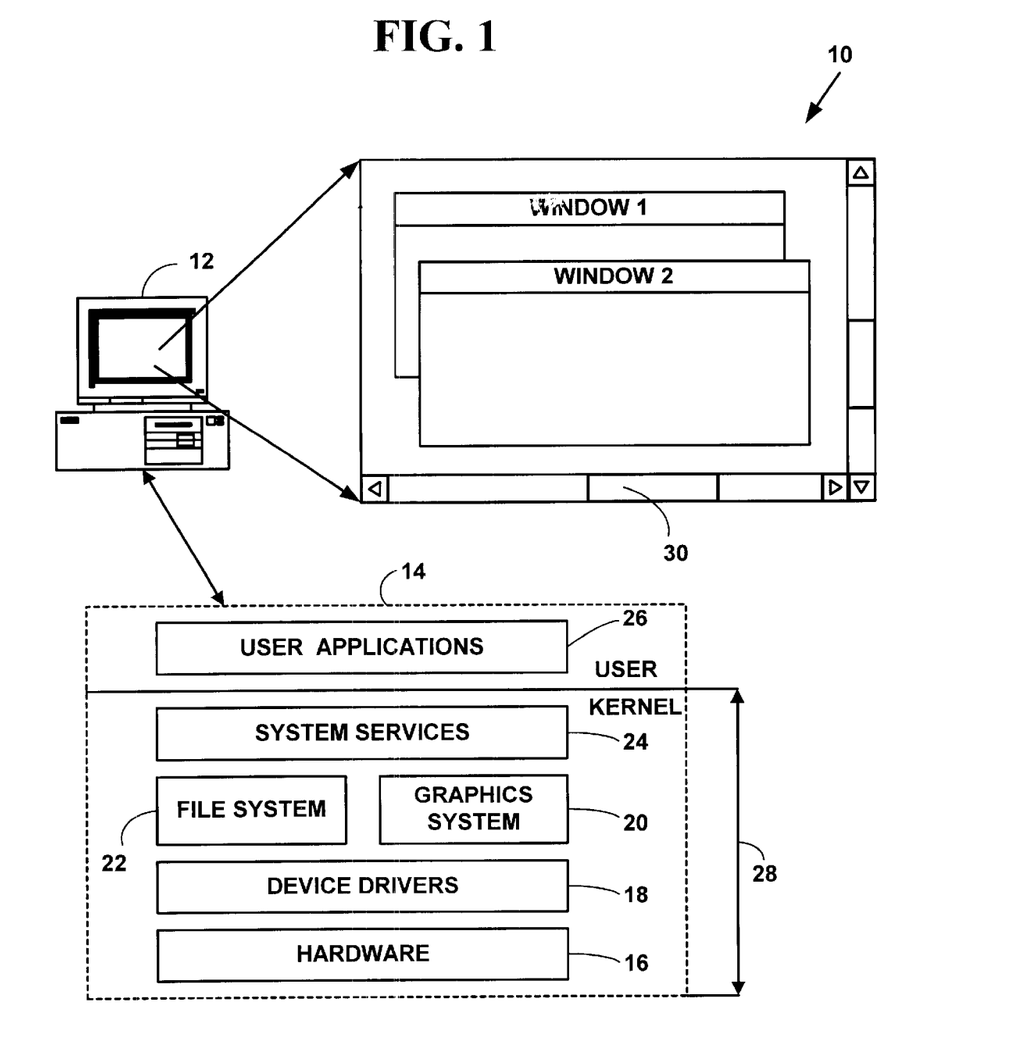
FIG. 1 is a block diagram illustrating an exemplary computing system with a windowed operating system.

FIG. 1 is a block diagram illustrating an exemplary computing system 10 for a preferred embodiment of the present invention. The computing system 10 includes a computer 12 with a generic windowed operating system 14. The generic windowed operating system 14 generally includes a hardware layer 16, a device driver layer 18, a file system layer 20, a graphics system layer 22, a system services layer 24 and a user applications layer 26. The hardware layer 16, device driver layer 18, file system layer 20, graphics system layer 22, and system services layer 24 comprise an operating system kernel 28. The generic windowed operating system 14 provides a Graphical User Interface ("GUI") 30 with multiple windows. However, more or fewer windowed operating system components could also be used and the present invention is not limited to the generic windowed operating system components illustrated in FIG. 1.

The hardware layer 16 is the actual hardware on the computer 12 such as monitor, keyboard, disk drive, etc. The device driver layers 18 is used to interact with actual hardware in the hardware layer 16. The file system layer 20 is used to create, save, retrieve and delete files. The graphic system layer 22 is used to create the GUI 30 with the multiple windows. The system services layer 24 is used to provide windowed operating system services. The user application layer 26 is used to provide user applications that interact with the windowed operating system kernel 28.

An operating environment for the computing system 10 for preferred embodiments of the present invention include a processing system with one or more high speed Central Processing Unit(s) ("CPU") and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed" or "CPU executed."

It will be appreciated that acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

Injecting Execution Logic into a Windowed Operating System

As was discussed above, it is desirable to inject execution logic into new address spaces that will execute before any application-related code executes. Preferred embodiments of the present invention allow execution logic to be injected into new address spaces that will execute before any application-related code executes.

Figure 2:
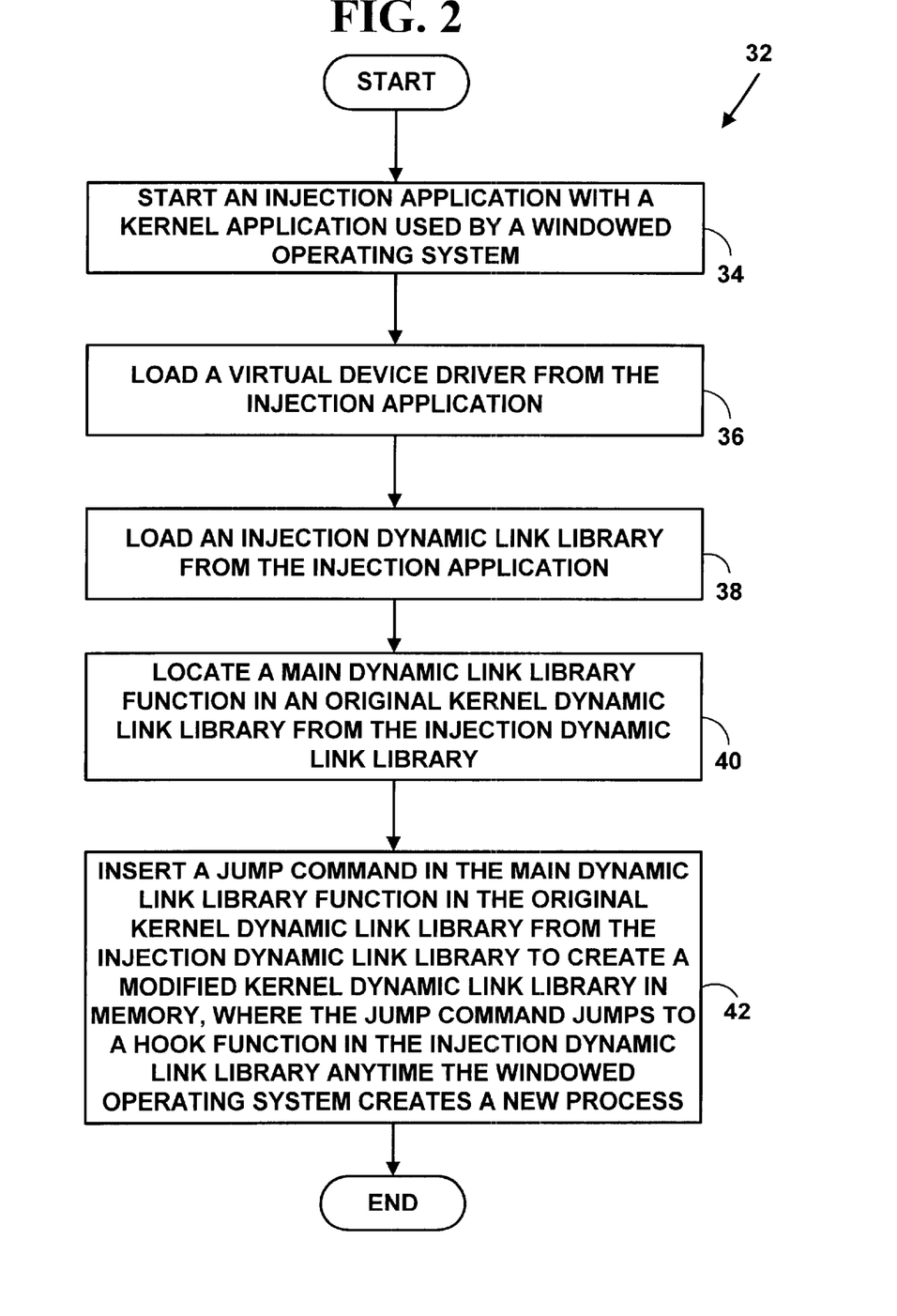
FIG. 2 is a flow diagram illustrating a method for dynamic injection of execution logic into a windowed operating system.

FIG. 2 is a flow diagram illustrating a Method 32 for dynamic injection of execution logic into a shared memory space of a windowed operating system. At Step 34, an injection application is started with a kernel application used by a windowed operating system. At Step 36, an injection virtual device driver is loaded at a first pre-determined memory location within an area of shared memory for the windowed operating system from the injection application. The virtual injection device driver is used to alter protected areas of memory for the windowed operating system. At Step 38, an injection dynamic link library is loaded from the injection application into a second predetermined memory location within an area of shared memory for the windowed operating system. At Step 40, a main dynamic link library function within an original kernel dynamic link library including kernel functions for the windowed operating system is located from the injection dynamic link library. At Step 42, a jump command is inserted from the injection dynamic link library within the main dynamic link library function in the original kernel dynamic link library to create a modified kernel dynamic link library in memory. The jump command jumps to an injection hook function within the injection dynamic link library whenever a new windowed operating system process is created. The injection hook function within the injection dynamic link library includes multiple injection functions that are executed by the windowed operating system prior to executing any application related logic in a new process address space created by the windowed operating system. The original kernel dynamic link library is replaced in memory with the modified kernel dynamic link library on the windowed operating system. The modified kernel dynamic link library on the windowed operating system is used for kernel services anytime a new process is requested on the windowed operating system. Method 32 allows execution logic to be injected into shared memory space on a windowed operating system that is executed before any application-related is executed.

In one exemplary preferred embodiment of the present invention, the windowed operating system is any of Windows 95/98 by the Microsoft Corporation of Redmond, Wash. However, other windowed operating systems that use shared memory spaces for processes could also be used and the present invention is not limited to Microsoft's windowed operating systems. Hereinafter, the Microsoft Windows 95/98 operating systems are refereed to Windows 95 for the sake of simplicity. For more information on the Windows 95 operating system see "Advanced Windows," $3^{rd}$ Edition, by Jeffrey Richter, Microsoft Press, Redmond, Wash., 1997, ISBN 1-57231-548-2, incorporated herein by reference.

Windows 95 is a pre-emptive multitasking operating system with multiple "processes" and "threads." A pre-emptive multitasking operating system uses a pre-determine method to determine which application attached to a process is to be run at a given time, based upon factors such as process's priority, whether it is blocked waiting to read or write, etc. Windows 95 uses Win32 processes are processes that use a 32-bit Win32 Application Programming Interface ("API").

Figure 3:
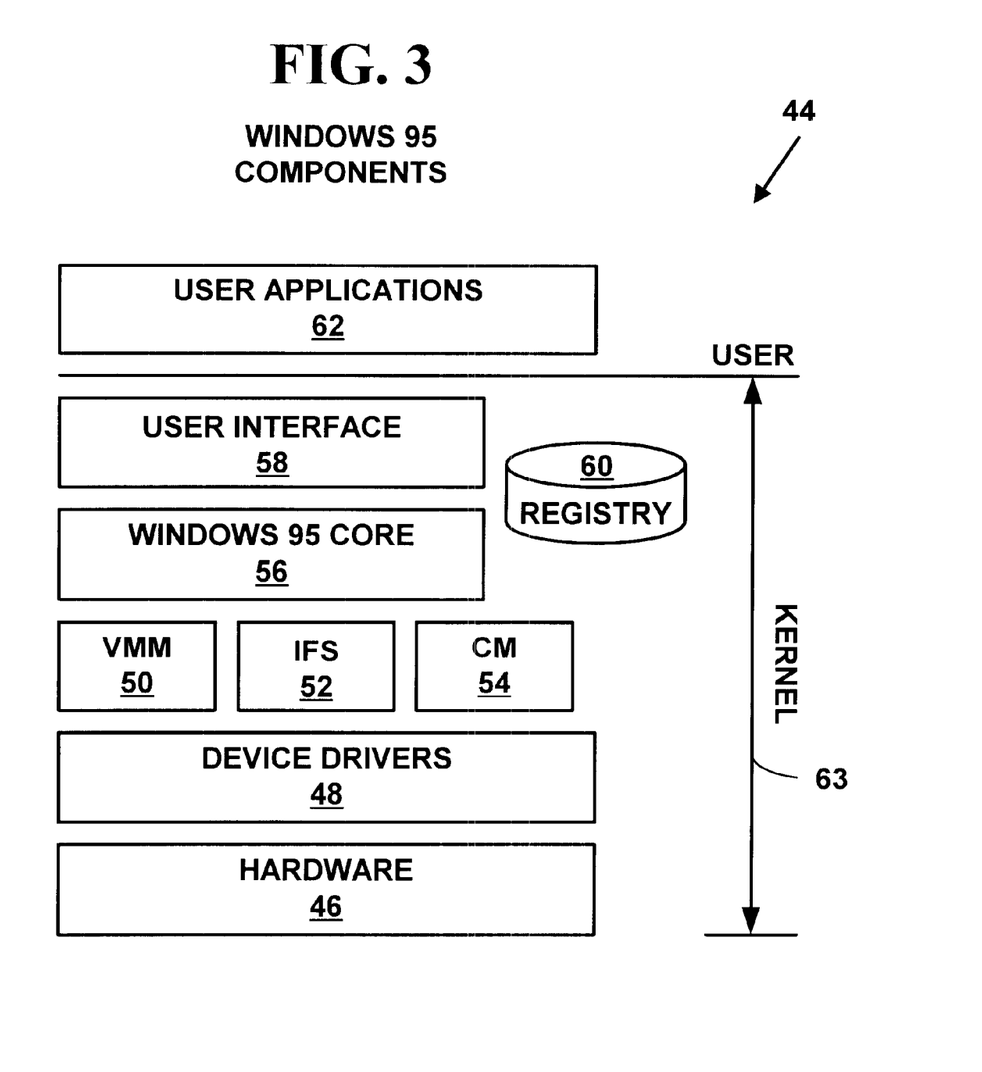
FIG. 3 is a block diagram illustrating exemplary Windows 95 operating system components.

FIG. 3 is a block diagram illustrating exemplary Windows 95 operating system components 44. The Windows 95 operating system components generally include a Hardware layer 46, a Device Driver Layer 48, Virtual Machine Manager ("VMM") 50, an Installable File System Manager ("IFS") 52, a Configuration Manager ("CM") 54, a Windows 95 Core 56, a 32-bit User Interface 58 layer, an operating system Registry 60, and an Applications layer 62 and Windows 95 components 46, 48, 52, 52, 54, 56, 58 and 60 comprise a Windows 95 kernel 63.

The Hardware layer 46 includes actual hardware on a computer (e.g., computer 12) such as monitor, keyboard, disk drive, etc. The Device Driver Layer 48 is used to interact with actual hardware in the Hardware layer 46. The VMM 50 is the 32-bit protected-mode operating system in Windows 95. Its primary responsibility is to create, run, monitor, and terminate virtual machines. The VMM 50 provides services that manage memory, processes, interrupts, and exceptions such as general protection faults. The VMM 50 works with virtual devices as, 32-bit protected-mode modules, to allow the virtual devices to intercept interrupts and faults to control the access that an application has to hardware devices and installed software.

Both the VMM 50 and virtual devices run in a single, 32-bit, flat model address space at privilege level zero. The VMM 50 has base address of zero and a limit of four Giga-bytes ("GBs"), so all the segment registers point to the same range of addresses. The VMM 50 provides multiple-threaded, preemptive multitasking. It runs multiple applications simultaneously by sharing CPU time between the virtual machines in which the applications run.

The IFS 52 manages files within Windows 95. The Configuration Manager 54 is used to configure Windows 95 operating system components. The Windows 95 Core 56 includes a core composed of three components, a User interface, a Kernel interface, and a Graphical Device Interface ("GDI"). Each of these components includes a pair of DLLs, one 32-bit and one 16-bit that provide operating system services for applications in the Applications layer 60. The User Interface layer 58 provides applications and tools for a 32-bit user interface that is used to create a multiple-windowed, GUI 30. The operating system Registry 60 is a hierarchical database that stores hardware, software and user configuration settings for a computer (e.g., the computer 12). The user Applications layer 62 is used for running user applications. This description of Windows 95 components in FIG. 3 is intended for illustrative purposes only and is not intended to include all details and components included in the Windows 95 architecture. Additional information on the Windows 95 operating system components can be obtained on the Internet at the Uniform Resource Locator ("URL") "http://msdn.microsoft.com/library/winresource/dnwin95."

In general, a Win32 process is an object that owns resources used by an application. Win32 processes are generally inert. That is, a Win32 process executes nothing, it simply owns a 4 Giga-Byte ("GB") address space that includes code and data for an application's executable (".EXE").

Figure 4:
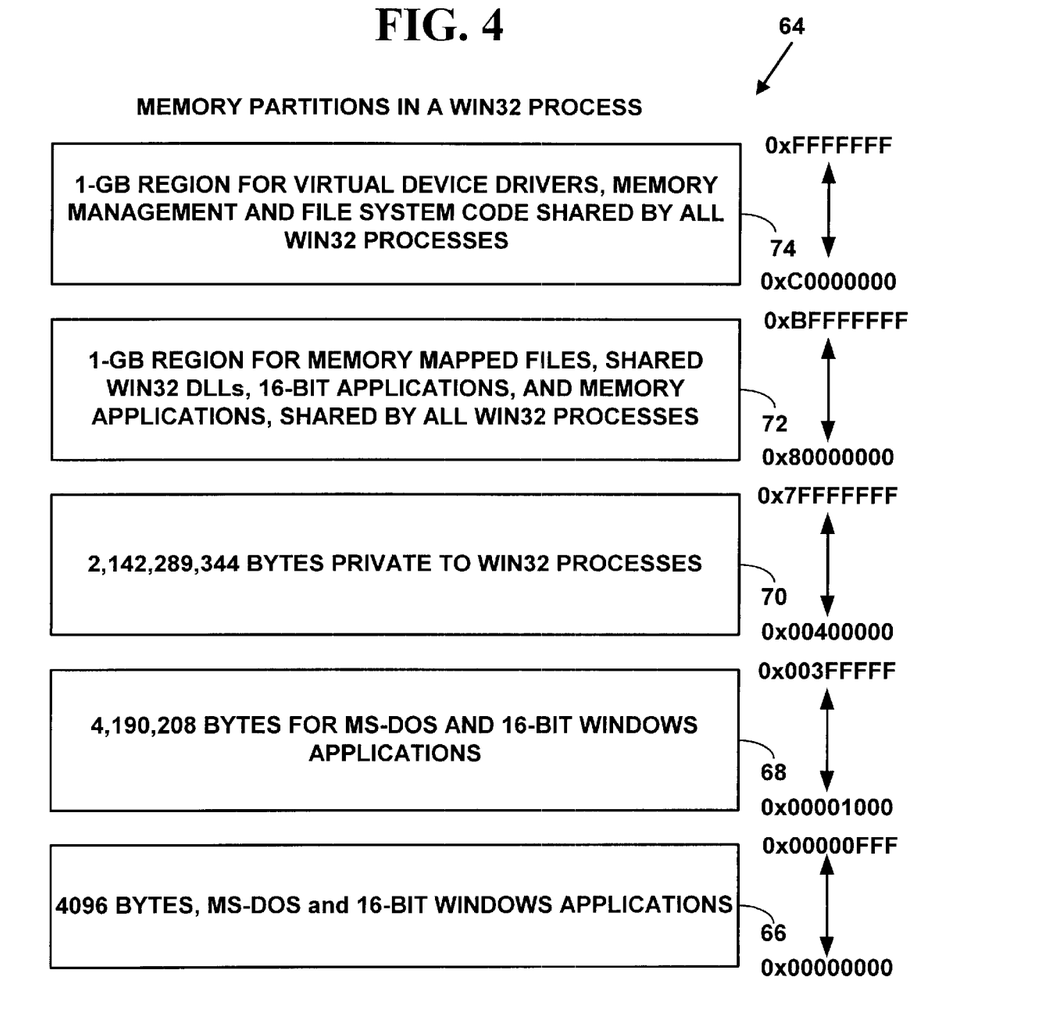
FIG. 4 is a block diagram illustrating a Windows 95 implementation of a Win32 process's memory address space.

FIG. 4 is a block diagram illustrating a Win32 process memory address space 64. The Win32 process 4 GB address space 64 includes a partition from 0x00000000 through 0x00000FFF 66, a partition from 0x00001000 to 0x003FFFFF 68, a partition from 0x00400000 through 0x7FFFFFFF 70, a partition from 0x80000000 through 0xBFFFFFFF 72 and a partition from 0xC0000000 through 0xFFFFFFFF 74.

The partitions from 0x00000000 through 0x003FFFFF 66,68 includes a 4-MB region at the bottom of the process's address space required by Windows 95 in order to maintain compatibility with the old MS-DOS and 16-bit Windows operating systems. The partition from 0x00400000 through 0x7FFFFFFF 70 includes a 2,143,289,344-byte (2-GB minus 4-MB) partition is where a process's private (unshared) address space resides. One Win32 process cannot read from, write to, or in any way access another process's data residing in this partition. For Win32 applications, this partition is where the bulk of the process's data is maintained. The Partition from 0x80000000 through 0xBFFFFFFF 72 is a 1-GB partition is where the operating system stores data that is shared among all Win32 processes. The Partition from 0xC0000000 through 0xFFFFFFFF 74 is a 1-GB partition where the operating system's code is located, including the system's virtual device drivers, low-level memory management code, and file system code.

For a Win32 process to accomplish anything, the process must own a thread. A thread is responsible for executing code that is contained in a process's address space. A thread is separate path of execution within a process. Threads share the process's virtual address space, executable code and global data, but execute independently of one another and have independent program stacks. In a simplest case, a process has a single, main thread known as a "primary" thread. When a Win32 process is created, a Win32 primary thread is automatically created. The Win32 primary thread can create additional threads, and these additional threads can create more threads.

Returning to FIG. 2, in one exemplary preferred embodiment of the present invention, at Step 34, an injection application called "INJECTION.EXE" is started with a kernel application used by Windows 95.

At Step 36, a Windows 95 injection Virtual device Driver ("VxD") is loaded into a first pre-determined location within an area of shared memory for Windows 95 from the injection application. The virtual injection device driver is used to alter protected areas of memory within Window 95/98. As is known in the art, (VxDs) are 32-bit programs that support the device-independent VMM's 50 by managing the computer's 12 hardware devices and supporting software. VxDs support hardware devices for a typical computer, including a Programmable Interrupt Controller ("PIC"), timer, Direct Memory Access ("DMA") device, disk controller, serial ports, parallel ports, keyboard, display adapter, etc. A VxD is typically required for any hardware device that has settable operating modes or retains data over any period of time. If the state of the hardware device can be disrupted by switching between multiple VMMs 50 or software applications, a corresponding VxD is used. VxDs also support software, with no corresponding hardware device. In general, a VxD can provide any kind of services for the VMM and other virtual devices. VxDs allow user to new virtual device drivers to be installed to support an add-on hardware device or provide some system-wide software service (e.g., injection of execution logic).

In one exemplary preferred embodiment of the present invention, the injection virtual device driver is loaded into a 1-GB area of memory in the partition from 0xC0000000 through 0xFFFFFFFF 74 within the 4-GB area of memory 64 allocated to a process. As is known in the art, this 1-GB partition 0xC0000000 74 through 0xFFFFFFFF 74 from is where the Window's 95 operating system's code is located, including the system's VxDs, low-level memory management code, and file system code. The code in this partition is shared among all Win32 processes.

At Step 38, an injection dynamic link library called INJECT.DLL is loaded from the injection application into a second pre-determined memory location within an area of shared memory for Windows 95. As is known in the art, a Dynamic Link Library ("DLL") provides a mechanism for linking applications to libraries of functions at run time. These libraries are "dynamically linked" because they are linked to an application when it is loaded and executed rather than when it is linked. When an application uses a DLL, the operating system loads the DLL into memory, resolves references to functions in the DLL so that they can be called by the application, and unloads the DLL when it is no longer needed. Loading a DLL into an address space results in execution of code within a DLL.

Dynamic linking can be performed explicitly by applications or implicitly by the operating system. DLLs are designed to provide resources to applications. DLLs most often appear as files with a .DLL filename extension; however, they may also have a executable (".EXE") or other filename extension.

In one exemplary preferred embodiment of the present invention, the injection dynamic link library is loaded into shared memory in the partition between 0x80000000 and 0xBFFFFFFF 72 within the 4-GB area of memory 64 allocated to a process. As is known in the art, this 1-GB partition between 0x80000000 and 0xBFFFFFFF 72 is where Windows 95 stores data that is shared among all Win32 processes. For example, the system dynamic-link libraries, KERNEL32.DLL, USER32.DLL, GDI32.DLL and ADVAP132.DLL are all loaded in this address space partition along with the injection dynamic link library, INJECT.DLL. This makes these DLLs available to all Win32 processes simultaneously. It also means that these DLLs are loaded at the same memory location for every Win32 process started.

At Step 40, a main dynamic link library function, called DllMain within an original KERNEL32.DLL for the Windows 95 operating system is located from the INJECT.DLL. As is 20 known in the art, the KERNEL32.DLL includes thread services, synchronization objects, memory management, memory-mapped file management, Input/Output ("I/O") and other operating system kernel functions in Windows 95. The DllMain function is a method of entry into a DLL. This function is called by Windows 95 when processes and threads are initialized and terminated, or upon calls to the LoadLibrary and FreeLibrary functions. During initial process startup or after a call to LoadLibrary, the Windows 95 scans the list of loaded DLLs for a process. In one exemplary preferred embodiment of the present invention, the location of the DllMain function is determined using the KERNEL32.DLL's Portable Executable ("PE") header structure. However, other methods can also be used to locate the DllMain function within the KERNEL32.DLL. For more information on the Portable Executable header see, "Peering Inside the PE: A Tour of the Win32 Portable Executable File Format" by Matt Pietrek, Microsoft Systems Journal, March 1994, incorporated herein by reference.

In one exemplary preferred embodiment of the present invention, at Step 42, a jump command is inserted from the INJECTION.DLL into the DllMain function in the original KERNEL32.DLL to create a modified KERNEL32.DLL. The injection hook function within the INJECT.DLL includes multiple injection functions that are executed by Windows 95 prior to executing any application related logic in a new Win32 process address space 64 created by Windows 95.

Table 1 illustrates psuedo code for an exemplary modified DllMain function in the modified KERNEL32.DLL. However, the present invention is not limited to the modified DllMain function illustrated in Table 1, and other modifications can also be made to the DllMain function.

TABLE 1

```
BOOL WINAPI DllMain (HINSTANCE hinstDll, DWORD fdwReason,
      LPVOID flmpLoad)
{
      JMP "ADDR OF HOOK FUNCTION" //jump to hook function in
      INJECT.DLL switch (fdwReason) {
            case DLL_PROCESS_ATTACH:
                  //Logic for a DLL being mapped into
                  //the process's address space.
            Break:
            Case DLL_THREAD_ATTACH
                  //Logic for a thread being created.
            break:
            case DLL_THREAD_DETEACH:
                  //Logic for is thread is exiting cleanly.
            break:
            case DLL_PROCESS-DETACH:
                  //Logic for the DLL is being unmapped from
                  //the process's address space.
            break;
      }
      return(TRUE);
}
```

In the command line for DllMain Table 1, the parameter hinstDLL is a Windows handle to a DLL. This handle is an index for a base address of the DLL. The parameter fdwReason, specifies a flag indicating why this DLL entry-point function is being called. The parameter flmpLoad Specifies further aspects of DLL initialization and cleanup.

Using Execution Logic Injected into a Windowed Operating System

Figure 5:
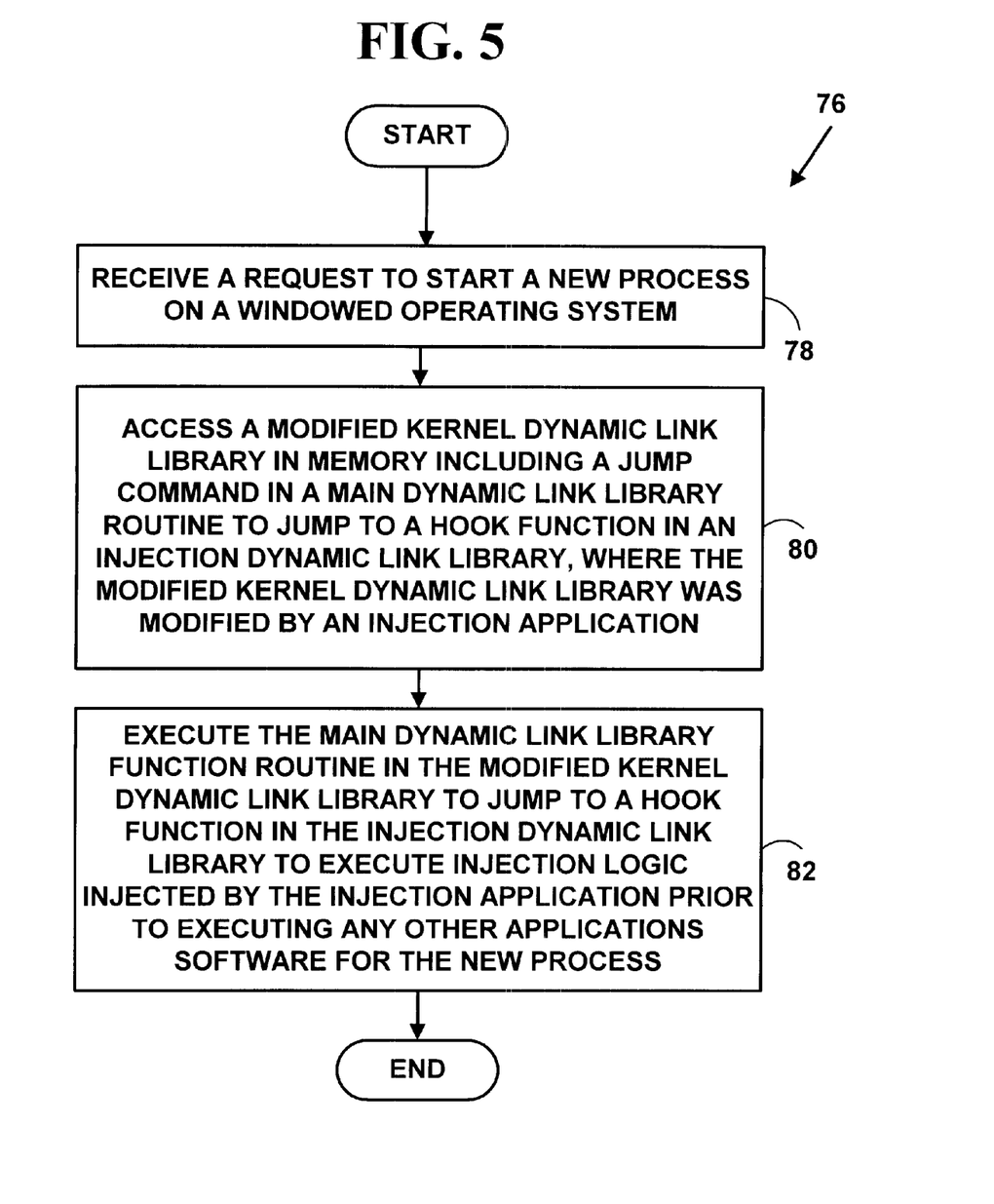
FIG. 5 is a flow diagram illustrating a method for using dynamically injected execution logic in a windowed operating system.

FIG. 5 is a flow diagram illustrating a Method 76 for using dynamically injected execution logic in a shared memory space in a windowed operating system. At Step 78, a request to create a new process is received on a windowed operating system. At Step 80, a modified kernel dynamic link library including a modified main dynamic link library function with jump command to jump to an injection hook function within an injection dynamic link library is accessed from shared memory within the windowed operating system. The modified kernel dynamic link library was modified by an injection application. The jump command in the main kernel dynamic link library function allows injection logic to be executed prior to executing any other application logic in a new process address space created by the windowed operating system. At Step 82, the modified main dynamic link library function in the kernel dynamic link library is executed to jump to the injection hook function within the injection dynamic link library to execute injection logic prior to executing any other application related logic in the new process address space created by the windowed operating system.

In one exemplary preferred embodiment of the present invention, the windowed operating system is Windows 95. However, other windowed operating systems could also be used and the present invention is not limited to Windows 95 operating systems. In one exemplary preferred embodiment of the present invention, a process is created when an application calls the Windows 95 CreateProcess function. The CreateProcess function creates a primary thread. The primary thread can create additional threads with the Windows 95 CreateThread function.

In one exemplary preferred embodiment of the present invention, at Step 78, Windows 95 receives a CreateProcess function call from an application. When a Windows 95 creates a new Win32 process, it also loads an operating system DLL, KERNEL32.DLL. This may occur directly by implicitly linking to one of the API calls exported by the KERNEL32.DLL. It may also occur by implicitly linking to another DLL that either directly or indirectly references functions within the KERNEL32.DLL.

In one exemplary preferred embodiment of the present invention, at Step 80, a modified KERNEL32.DLL including a modified DllMain function with jump command to jump to an injection hook function within an INJECT.DLL accessed from shared memory (e.g., partition from 0x80000000 to 0xBFFFFFFF 72) by Windows 95. The modified KERNEL32.DLL was modified using Method 32 of FIG. 2. The jump command in the DllMain function allows injection logic to be executed prior to executing any other application related logic in the new Win32 process address space 64 created by Windows 95. The Windows 95 loading logic is designed to execute the DllMain functions for all implicitly linked DLLs in dependency order. The DllMain functions are executed before an executable application entry point is invoked. When a new Win32 process is created, KERNEL32.DLL is always the first module in the dependency order since this DLL includes kernel services required by a process. Thus, the DllMain function is executed prior to an application related code for a process. The modified DllMain function in the modified KERNEL32.DLL with jump command to jump to an injection hook function within the INJECT.DLL allows functions called by the injection hook function to be executed prior to any applications related code in new processes created by Windows 95/98.

At Step 82, the modified DllMain function in the modified KERNEL32.DLL is executed to jump to the injection hook function within the INJECT.DLL to execute injection logic prior to executing any other application related logic in the new Win32 process address space 64 (e.g., See Table 1).

Exemplary Dynamic Injection System

Figure 6:
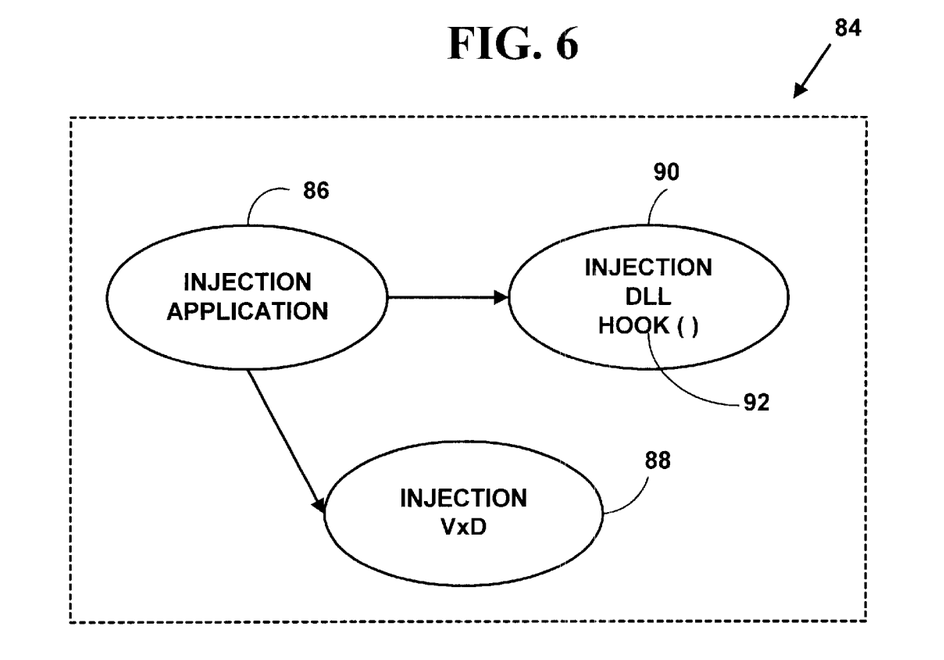
FIG. 6 is a block diagram illustrating an exemplary system for dynamically injecting execution logic into a windowed operating system.

FIG. 6 is a block diagram illustrating an exemplary injection system 84 for dynamically injecting execution logic into a shared memory space in a windowed operating system. The injection system 84 includes an injection application 86 that loads an injection virtual device driver 88, and an injection dynamic link library 90 with an injection hook function 92. However more or fewer components could also be used in the exemplary injection system 84 and the present invention is not limited to the system components illustrated.

The injection virtual device driver 88 is used for altering protected memory areas within a windowed operating system for injection functions. The injection dynamic link library 90 includes multiple injection functions for executing injection logic and for modifying a main kernel dynamic link library function in an original kernel dynamic link library with a jump command to jump to an injection hook function 92 within an injection dynamic link library. The injection functions from the injection dynamic link library are used execute injection logic prior to executing any other application related logic in a new process address space created by the windowed operating system. The injection dynamic link library 90 includes an injection hook function 92 for calling injection functions from an injection dynamic link library. The injection hook function 92 is called with a jump command inserted into a main dynamic link library function in an original kernel dynamic link library loaded when a windowed operating system creates a new process.

The methods and system described herein overcome some of the problems associated with DLL injection through AppInit_DLLs or SetWindowsHookEx. These functions will only inject a DLL in a Win32 process that executes code within USER32.DLL and the code will only be invoked after an application has started processing. Code patching and remote threads work on a specific user modified process not a new process created by Windows 95.

The methods and system of the present invention allow execution logic to be injected into new processes created by windowed operating systems. The methods and system of the present invention may be used for debugging aids, hooking other processes, tracing the execution of an application, and for other purposes.

The methods and system of the present invention may not work with certain windowed operating system that do not use a shared memory for processes (e.g., Windows NT). The problems associated with dynamically injecting execution logic into windowed operating systems that do not use shared memory for processes are overcome in co-pending application Ser. No. 09/285,195, titled "METHOD AND SYSTEM FOR DYNAMIC INJECTION OF EXECUTION LOGIC INTO A WINDOWED OPERATING SYSTEM", filed on Apr. 8, 1999, incorporated herein by reference.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments hardware or firmware implementations may alternatively be used, and vice-versa.

The claims should not be read as limited to the described order or elements unless stated to that effect. Therefore, all embodiments that come within the scope and spirit of the following claims and equivalents thereto are claimed as the invention.

I claim:

1. In a computer system with a windowed operating system, a method of dynamically injecting execution logic, comprising the following steps:

starting an injection application from a kernel application used by a windowed operating system;

loading an injection virtual device driver from the injection application into a first pre-determined memory location in an area of shared memory in the windowed operating system, wherein the injection virtual device driver is used to alter protected areas of memory within the windowed operating system;

loading an injection dynamic link library from the injection application into a second pre-determined memory location in an area of shared memory for the windowed operating system;

locating a main dynamic link library function within an original kernel dynamic link library including kernel function for the windowed operating system; and inserting a jump command into the main dynamic link library function in the original kernel dynamic link library to create a modified kernel dynamic link library, wherein the jump command jumps to an injection hook function within the injection dynamic link library whenever a new windowed operating system process is created, and wherein the injection hook function within the injection dynamic link library includes a plurality of injection functions and that are executed by the windowed operating system prior to executing any other application related logic in a new process address space created by the windowed operating system.

2. A computer readable medium having stored therein instructions for causing a central processing unit to execute the method of claim 1.

3. The method of claim 1 wherein the windowed operating system is any of Windows 95 or Windows 98.

4. The method of claim 1 the step of locating a main dynamic link library function within a dynamic link library including kernel functions for the windowed operating system from the injection dynamic link library includes locating a main dynamic link library function called DllMain within an original kernel dynamic link library including kernel functions called KERNEL32.DLL within the windowed operating system.

5. The method of claim 1 wherein the step of locating a main dynamic link library function within a dynamic link library including kernel functions for the windowed operating system from the injection application includes locating the main dynamic link library function with information from a header in the dynamic kernel link library including kernel functions.

6. The method of claim 5 wherein the header is a Portable Executable header from dynamic link library including kernel functions called KERNEL32.DLL within the windowed operating system.

7. The method of claim 1 wherein the step of loading an injection dynamic link library from the injection application into a second pre-determined memory location within an area of shared memory within the windowed operating system includes loading the injection dynamic link library into a memory location anywhere between memory addresses 0x80000000 and 0xBFFFFFFF within a four Giga-Byte area of memory allocated to a process within the windowed operating system.

8. The method of claim 1 wherein the step of inserting a jump command from the injection application within the main dynamic link library function in the original kernel dynamic link library to create a modified kernel dynamic link library further includes:
   replacing the original kernel dynamic link library with the modified kernel dynamic link library on the windowed operating system; and
   using the modified kernel dynamic link library on the windowed operating system for kernel services anytime a new process is requested on the windowed operating system.

9. The method of claim 1 wherein the area of shared memory for the windowed operating system is a four Giga-Byte area of memory allocated to a process within the windowed operating system.

10. The method of claim 1 wherein the new process is a Win32 process.

11. In a computer system with a windowed operating system, a method of using dynamically injected execution logic, comprising the following steps:
   receiving a request to create new process on a windowed operating system;
   accessing a modified kernel dynamic link library, including a modified main kernel dynamic link library function with jump command to jump to an injection hook function within an injection dynamic link library, from an area of shared memory within the windowed operating system,
   wherein the modified main kernel dynamic link library was modified by an injection application, and wherein the jump command in the main kernel dynamic link library function allows injection logic to be executed prior to executing any other applications related logic in a new process address space created by the windowed operating system; and
   executing the modified main dynamic link library function in the kernel dynamic link library to jump to the injection hook function within the injection dynamic link library to execute injection logic prior to executing any other applications related logic in a new process address space created by the windowed operating system.

12. A computer readable medium having stored therein instructions for causing a central processing unit to execute the method of claim 11.

13. The method of claim 11 wherein the modified kernel dynamic link library is a modified kernel dynamic link library called KERNEL32.DLL in the windowed operating system that was modified by an injection application.

14. The method of claim 11 wherein the modified main kernel dynamic link library function with jump command to jump to an injection hook function within an injection dynamic link library is a main kernel dynamic link library function called DllMain within the windowed operating system.

15. The method of claim 11 wherein the new process is a Win32 process.

16. The method of claim 11 wherein the windowed operating system is any of Windows 95 or Windows 98.

17. The method of claim 11 wherein the step of executing the modified main dynamic link library function in the kernel dynamic link library to jump to the injection hook function within the injection dynamic link library to execute injection logic includes executing functions within the injection hook function to track any of a process's existence, a process's usage of system resources, process debugging, process redirected or process termination requests.

18. The method of claim 11 wherein the step of executing the modified main dynamic link library function in the kernel dynamic link library to jump to the injection hook function within the injection dynamic link library to execute injection logic is executed for every new process created by the win do wed operating system.

19. A system for dynamically injecting execution logic into a windowed operating system, comprising in combination:
   an injection application that loads an injection virtual device driver and an injection dynamic link library into areas of shared memory within a windowed operating system;
   an injection dynamic link library with a plurality of injection functions for executing injection logic and for modifying main kernel dynamic link library function in an original kernel dynamic link library with jump command to jump to an injection hook function within an injection dynamic link library, wherein the injection functions from the injection dynamic link library are used to execute injection logic prior to executing any other applications related logic in a new process address space created by a windowed operating system;
   an injection hook function for calling injection functions from an injection dynamic link library, wherein the injection hook function is called with a jump command inserted into a main dynamic link library function in a modified kernel dynamic link library loaded when a windowed operating system creates a new process; and
   an injection virtual device driver for altering protected memory areas within a windowed operating system.

20. The system of claim 19 wherein the windowed operating system is any of Windows 95 or Windows 98.

* * * * *